United States Patent
Max et al.

(10) Patent No.: US 12,131,553 B2
(45) Date of Patent: Oct. 29, 2024

(54) METHOD, COMPUTER PROGRAM, AND DEVICE FOR PROCESSING DATA RECORDED BY A MOTOR VEHICLE

(71) Applicant: Volkswagen Aktiengesellschaft, Wolfsburg (DE)

(72) Inventors: Stephan Max, Gifhorn (DE); Martin Wegner, Braunschweig (DE); Sabina Alazzawi, Munich (DE); Richard Niestroj, Munich (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 319 days.

(21) Appl. No.: 17/623,160

(22) PCT Filed: May 20, 2020

(86) PCT No.: PCT/EP2020/064084
§ 371 (c)(1),
(2) Date: Dec. 27, 2021

(87) PCT Pub. No.: WO2020/259932
PCT Pub. Date: Dec. 30, 2020

(65) Prior Publication Data
US 2022/0262126 A1   Aug. 18, 2022

(30) Foreign Application Priority Data
Jun. 28, 2019   (DE) .................... 10 2019 209 485.6

(51) Int. Cl.
*G06V 20/58* (2022.01)
*G06T 7/10* (2017.01)

(52) U.S. Cl.
CPC ............ *G06V 20/58* (2022.01); *G06T 7/10* (2017.01)

(58) Field of Classification Search
CPC .......... G06V 20/58; G06T 7/10; G07C 5/008; G07C 5/0841; G07C 5/0808;
(Continued)

(56) References Cited

U.S. PATENT DOCUMENTS

| 8,255,393 B1 | 8/2012 | Yu et al. ................. 707/724 |
| 8,611,650 B2 | 12/2013 | Klein et al. ............ 382/165 |

(Continued)

FOREIGN PATENT DOCUMENTS

| CN | 105871831 A | 8/2016 | ............ H04L 29/06 |
| DE | 102011106295 A1 | 1/2012 | .............. G08G 1/01 |

(Continued)

OTHER PUBLICATIONS

U.S. Non-Final Office Action, U.S. Appl. No. 17/623,004, 23 pages, Oct. 5, 2023.
(Continued)

*Primary Examiner* — Nimesh Patel
(74) *Attorney, Agent, or Firm* — Slayden Grubert Beard PLLC

(57) ABSTRACT

The disclosure relates to a method, to a computer program with instructions, and to a device for processing data recorded by a motor vehicle. The disclosure additionally relates to a motor vehicle and to a back end in which a method according to the disclosure or a device according to the disclosure is used. In a first step, an item of data recorded by a motor vehicle is received. A temporal obfuscation is then applied to the received item of data. In the process, a temporally segmented obfuscation interval is used for the temporal obfuscation. The obfuscated item of data is finally forwarded for further processing. The temporal obfuscation can be carried out within the motor vehicle or in a back end connected to the motor vehicle.

13 Claims, 3 Drawing Sheets

(58) Field of Classification Search
CPC ... G07C 5/0858; G08G 1/0112; H04W 12/02; H04W 4/029; H04W 4/40; H04W 4/02; H04W 88/02; H04W 4/027; H04W 12/63; H04L 45/22; H04L 63/123; H04L 67/125; H04L 63/10; H04L 2209/04; H04L 67/535; H04L 63/0227; G06F 21/6218; G06F 21/6245; G06F 21/6227; G06F 21/6281; G06F 16/24573; G06F 16/00; G06F 30/27; G06F 21/31; G06F 21/86; G06F 2211/007; G06F 16/278; G06F 18/2413; G06F 9/543; G06F 9/5061; G06N 20/00; G06N 3/045; G06N 20/10; G06N 3/006; G06N 3/044; G06N 3/08; G06N 5/022; G06N 5/025; G06N 3/049; G06N 3/0464; G06N 3/02; G06N 3/0455; G06N 3/091; G06N 3/096; G06N 7/023

See application file for complete search history.

(56) References Cited

U.S. PATENT DOCUMENTS

| | | | |
|---|---|---|---|
| 8,711,688 B1* | 4/2014 | Smith | H04K 3/825 380/252 |
| 8,972,187 B1 | 3/2015 | Steinmetz et al. | 701/533 |
| 8,978,153 B1 | 3/2015 | Cuthbertson | 726/26 |
| 9,471,852 B1 | 10/2016 | Feris et al. | |
| 9,794,373 B1 | 10/2017 | Steinmetz | |
| 10,032,368 B1 | 7/2018 | Thompson et al. | |
| 10,311,446 B2 | 6/2019 | Prehofer et al. | |
| 10,382,889 B1 | 8/2019 | Ajmeri et al. | |
| 10,679,077 B2 | 6/2020 | Kinoshita et al. | |
| 10,846,428 B2 | 11/2020 | Max et al. | |
| 11,335,187 B2 | 5/2022 | Jonietz et al. | |
| 11,868,479 B2* | 1/2024 | Lysecky | G16H 20/17 |
| 2002/0177950 A1 | 11/2002 | Davies | 701/479 |
| 2005/0069138 A1 | 3/2005 | De Jong | 380/278 |
| 2008/0027627 A1 | 1/2008 | Ikeda et al. | 701/117 |
| 2009/0157566 A1 | 6/2009 | Grush | 705/400 |
| 2010/0079590 A1 | 4/2010 | Kuehnle et al. | 348/118 |
| 2011/0231057 A1 | 9/2011 | Ashjaee et al. | 701/41 |
| 2012/0042046 A1 | 2/2012 | Petersen et al. | 709/219 |
| 2012/0121183 A1 | 5/2012 | Joshi | 382/191 |
| 2012/0197873 A1 | 8/2012 | Uramoto et al. | 707/722 |
| 2013/0117830 A1* | 5/2013 | Erickson | H04L 63/0428 726/28 |
| 2013/0335237 A1 | 12/2013 | Zarka et al. | 340/905 |
| 2014/0163875 A1 | 6/2014 | Mund et al. | 701/532 |
| 2015/0300835 A1 | 10/2015 | Fowe et al. | 701/410 |
| 2015/0350890 A1 | 12/2015 | Arunkumar et al. | 455/411 |
| 2016/0065559 A1* | 3/2016 | Archer | H04L 63/0861 726/8 |
| 2016/0104377 A1 | 4/2016 | French et al. | 701/117 |
| 2016/0150361 A1 | 5/2016 | Zhu et al. | 455/456.1 |
| 2016/0280224 A1 | 9/2016 | Tatourian et al. | 701/93 |
| 2016/0358349 A1 | 12/2016 | Dorum | 345/440 |
| 2016/0364983 A1 | 12/2016 | Downs et al. | 701/119 |
| 2017/0010618 A1 | 1/2017 | Shashua et al. | 701/26 |
| 2017/0083708 A1 | 3/2017 | Braghin et al. | 726/26 |
| 2017/0118634 A1* | 4/2017 | Xiong | H04W 12/02 |
| 2017/0219357 A1 | 8/2017 | Pfeifle | |
| 2017/0269605 A1 | 9/2017 | Myers et al. | |
| 2017/0358204 A1 | 12/2017 | Modica et al. | |
| 2017/0366513 A1 | 12/2017 | Kumaran | |
| 2018/0173895 A1* | 6/2018 | Max | G06F 21/6254 |
| 2018/0173970 A1 | 6/2018 | Bayer et al. | |
| 2018/0188053 A1 | 7/2018 | Fukuda et al. | |
| 2018/0231387 A1 | 8/2018 | Thiel et al. | |
| 2018/0252536 A1 | 9/2018 | Dorum | |
| 2018/0261021 A1 | 9/2018 | Rosenbaum | |
| 2018/0315180 A1 | 11/2018 | Townsend | |
| 2019/0017832 A1 | 1/2019 | Busser | |
| 2019/0051062 A1 | 2/2019 | Mueck | |
| 2019/0051172 A1 | 2/2019 | Stenneth et al. | |
| 2019/0086925 A1 | 3/2019 | Fan et al. | |
| 2019/0116492 A1 | 4/2019 | Osumi | |
| 2019/0156062 A1 | 5/2019 | Busser | |
| 2019/0196481 A1 | 6/2019 | Tay et al. | |
| 2019/0258260 A1 | 8/2019 | Sunil Kumar et al. | |
| 2019/0271551 A1 | 9/2019 | Stess | |
| 2019/0272389 A1 | 9/2019 | Viente et al. | |
| 2019/0272746 A1 | 9/2019 | Aguiar et al. | |
| 2020/0018607 A1 | 1/2020 | Balu | |
| 2020/0019815 A1 | 1/2020 | Balu | |
| 2020/0042620 A1 | 2/2020 | Aggarwal et al. | |
| 2020/0132476 A1 | 4/2020 | Roeth et al. | |
| 2020/0271458 A1 | 8/2020 | Berry et al. | |
| 2020/0364953 A1 | 11/2020 | Simoudis | |
| 2020/0379122 A1* | 12/2020 | Tontiruttananon | G01S 19/215 |
| 2020/0386569 A1 | 12/2020 | Stajner et al. | |
| 2020/0387632 A1* | 12/2020 | McErlean | G01S 19/42 |
| 2020/0394905 A1 | 12/2020 | Bernhardt et al. | |
| 2020/0402393 A1 | 12/2020 | Jonietz et al. | |
| 2021/0027117 A1 | 1/2021 | Mcgavran et al. | |
| 2021/0075775 A1* | 3/2021 | Cheng | G06F 21/6245 |
| 2021/0095990 A1 | 4/2021 | Fowe et al. | |
| 2021/0108924 A1 | 4/2021 | Vedaste et al. | |
| 2021/0176597 A1 | 6/2021 | Li et al. | |
| 2022/0116742 A1 | 4/2022 | Tal et al. | |
| 2022/0120585 A1 | 4/2022 | Max et al. | |
| 2022/0136846 A1 | 5/2022 | Bhorkar et al. | |
| 2023/0282036 A1 | 9/2023 | Simoudis | |

FOREIGN PATENT DOCUMENTS

| | | | |
|---|---|---|---|
| DE | 102013204128 A1 | 9/2014 | ............ G06F 15/16 |
| DE | 102014208465 A1 | 11/2015 | ............ G08G 1/01 |
| DE | 102016200855 B3 | 9/2016 | ............ G01C 21/14 |
| DE | 102015213393 A1 | 1/2017 | ............ G08G 1/01 |
| DE | 102015216414 A1 | 3/2017 | ............ H04L 9/00 |
| DE | 102016110331 B3 | 6/2017 | ............ G08G 1/01 |
| DE | 102016225287 A1 | 6/2018 | ............ G08G 1/01 |
| DE | 102018006281 A1 | 2/2019 | ............ B06W 50/02 |
| DE | 102019209226 A1 | 12/2020 | ............ G07C 5/08 |
| DE | 102019209711 A1 | 1/2021 | ............ G07C 5/08 |
| EP | 2423885 A1 | 2/2012 | ............ G07B 15/06 |
| EP | 2827547 A1 | 1/2015 | ............ H04L 29/06 |
| WO | 2020/259932 A1 | 12/2020 | ............ G07C 5/00 |
| WO | 2020/259933 A1 | 12/2020 | ............ G05D 1/00 |
| WO | 2021/001207 A1 | 1/2021 | ............ G08G 1/01 |

OTHER PUBLICATIONS

Gruteser, Marco et al., "Anonymous Usage of Location-Based Services Through Spacial and Temporal Cloaking," Proceedings of MobiSys 2003: The First International Conference on Mobile Systems, Applications, and Services, pp. 31-42, May 5, 2003.

Gedik, Buğra et al., "Location Privacy in Mobile Systems: A Personalized Anonymization Model," Proceedings of the 25th IEEE International Conference on Distributed Computing Systems, pp. 620-629, Jun. 6, 2005.

Mascetti, Sergio et al., "κ-Anonymity in Databases with Timestamped Data," IEEE 13th International Symposium on Temporal Representation and Reasoning (TIME'06), pp. 177-186, 2006.

Gedik, Buğra et al., "Protecting Location Privacy with Personalized κ-Anonymity: Architecture and Algorithms," IEEE Transactions on Mobile Computing, vol. 7, No. 1, 18 pages, Jan. 1, 2008.

German Office Action, Application No. 102019209485.6, 10 pages, Jan. 14, 2020.

German Office Action, Application No. 102019209711.1, 6 pages, Jun. 10, 2020.

International Search Report and Written Opinion, Application No. PCT/EP2020/064084, 7 pages, Aug. 14, 2020.

International Search Report and Written Opinion, Application No. PCT/EP2020/064087, 11 pages, Sep. 14, 2020.

International Search Report and Written Opinion, Application No. PCT/EP2020/067453, 10 pages, Oct. 5, 2020.

Wightman, Pedro M. et al., "Matlock: A Location Obfuscation Technique for Accuracy-Restricted Applications," 2012 IEEE Wire-

(56) References Cited

OTHER PUBLICATIONS less Communications and Networking Conference: Mobile and Wireless Networks, pp. 1829-1834, Mar. 2012.
U.S. Non-Final Office Action, U.S. Appl. No. 17/624,389, 31 pages, Jan. 29, 2024.
U.S. Notice of Allowance, U.S. Appl. No. 17/624,389, 27 pages, May 16, 2024.
U.S. Final Office Action, U.S. Appl. No. 17/623,004, 21 pages, May 17, 2024.
U.S. Non-Final Office Action, U.S. Appl. No. 17/623,004, 18 pages.

* cited by examiner

METHOD, COMPUTER PROGRAM, AND DEVICE FOR PROCESSING DATA RECORDED BY A MOTOR VEHICLE

CROSS-REFERENCE TO RELATED APPLICATIONS

This application claims priority to German Patent Application No. DE 10 2019 209 485.6, filed Jun. 28, 2019 with the German Patent and Trademark Office. The contents of the aforesaid Patent Application are incorporated herein for all purposes.

TECHNICAL FIELD

The present invention relates to a method, a computer program with instructions, and a device for processing data recorded by a motor vehicle. The invention further relates to a motor vehicle and a back end in which a method according to the invention or a device according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern motor vehicles, a variety of data is collected. With increasing vehicle connectivity, there is an interest in using the data collected by a vehicle for further evaluation. For this purpose, data can be taken from the motor vehicle and fed to a back end. For example, data can be extracted from vehicle sensors in a location- or time-dependent manner for applications relating to weather forecasts, parking space occupancy, or traffic flow data. In the back end, the data are then combined with other data on a map and fed back to the functions using said data.

One important application scenario for data collection is the creation of a database for anonymized swarm data for researching, developing, and safeguarding automatic driving functions. Highly automated vehicles are expected to cope with a plethora of different and sometimes complex road traffic scenarios without there being an accident. However, since the majority of these scenarios occur only very rarely, testing in real road traffic is both time- and cost-intensive. A substantial database is therefore required for the development of automatic driving functions to series maturity in order to safeguard the algorithms, as this can no longer be achieved by means of classic endurance test runs. Therefore, a data pool is required which has data from as wide a variety of challenging traffic situations as possible, ideally supplied from real driving situations, by means of which data pool the algorithms can be trained and continuously improved such that the vehicles can make appropriate decisions and act safely in road traffic in all eventualities.

However, the data taken from a vehicle can sometimes provide an indication of the personal or material circumstances of an identified or at least identifiable natural person, for example the driver of the motor vehicle.

Such collection and use of the data is generally only possible with a declaration of consent of the relevant person, as per applicable data protection regulations. Although consumers today, in particular in the software field, are quite familiar with accepting conditions of use and granting approval for the evaluation of data, this is not very common in the automotive sector. It is therefore not always easy to obtain a declaration of consent for the use of the data. In addition, software updates may potentially require a new declaration of consent to be obtained from the user, which could become a nuisance for the user over time.

In order to ensure the protection of data, the data can be subjected to different anonymization methods. The aim of these anonymization methods is to conceal the identity of the data originator in an anonymization group.

Although temporal obfuscation methods are well suited for concealing the identity of the data originator within an anonymization group, use of said methods entails a certain amount of devaluation of data relating to traffic movements. During the analysis of traffic movements, the time of day should be left intact, since many phenomena depend on the time of day. Examples of this include traffic movements during rush hour or commuter traffic.

SUMMARY

A need exists to provide solutions for processing data recorded by a motor vehicle in which a devaluation of the data caused by a temporal obfuscation of the data is reduced.

The need is addressed by a method, by a computer program, and by a device having the features of the independent claims. Embodiments of the invention are described in the dependent claims, the following description, and the drawings.

DESCRIPTION

Figure 1:
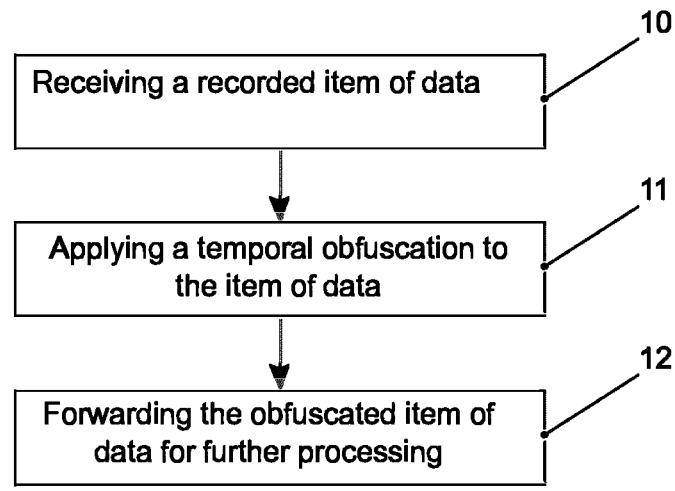
FIG. 1 schematically shows an exemplary method for processing data recorded by a motor vehicle.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for processing data recorded by a motor vehicle comprises:
  receiving an item of data recorded by a motor vehicle;
  applying a temporal obfuscation to the received item of data, wherein a temporally segmented obfuscation interval is used for the temporal obfuscation; and
  forwarding the obfuscated item of data for further processing.

In some embodiments, a computer program contains instructions which, when executed by a computer, prompt the computer to carry out the following steps for processing data recorded by a motor vehicle:

receiving an item of data recorded by a motor vehicle;

applying a temporal obfuscation to the received item of data, wherein a temporally segmented obfuscation interval is used for the temporal obfuscation; and forwarding the obfuscated item of data for further processing.

The term "computer" is to be understood broadly. In particular, it may also include control units, workstations, and other processor-based data processing devices.

The computer program may for example be provided for electronic retrieval or be stored on a computer-readable storage medium.

In some embodiments, a device for processing data recorded by a motor vehicle comprises:

an input for receiving an item of data recorded by a motor vehicle;

an anonymization unit for applying a temporal obfuscation to the received item of data, wherein a temporally segmented obfuscation interval is used for the temporal obfuscation; and an output for forwarding the obfuscated item of data for further processing.

In the solution, the additive noise for the temporal obfuscation is segmented and distributed or the measurements are shifted such that the data are stable within a desired interval. The segmentation of the obfuscation interval is based on the observation that the traffic situation often repeats itself periodically. If the temporal obfuscation requires the time of measurement to be shifted within an interval of, for example, 90 mins, while a temporal obfuscation of no more than 30 mins is acceptable from the point of view of data requirements, the 90-minute obfuscation interval can be divided into multiple segments each having a length of no more than 30 mins. Each of these segments includes one of the above-mentioned periodic repetitions of the traffic situation. In this way, it is possible to reconcile the inherently contrary conditions for the required obfuscation and for preventing excessive data devaluation. All that is required for this is knowledge of the periodicity of the traffic situation. Examples of a periodic traffic situation include rush-hour traffic and commuter traffic, wherein an identical or very similar traffic situation may occur multiple times per day at least locally in shifts, e.g., traffic journeying to and from recurring events, traffic prior to the departure or after the arrival of a ferry or motorail train, etc.

In some embodiments, segments of the temporally segmented obfuscation interval are on different days. For example, it may be assumed that the traffic event repeats itself on a daily basis, in particular rush-hour traffic or commuter traffic, in such a way that the circumstances are identical or at least very similar over a period of days. The different days do not necessarily have to follow on from one another; some days may also be disregarded. In this connection, it may also be provided for the segments to each be on the same day of the week, i.e., be one week apart. However, this delays the provision of data by a corresponding amount of time.

In some embodiments, weekends, holidays, or recurring events are taken into account if the segments of the temporally segmented obfuscation interval are distributed over different days. During distribution of the segments, it can be taken into account that the phenomena sought only take place on weekdays, for example. Accordingly, during distribution of the segments, holidays, weekends, etc., may be excluded from the distribution of the segments and thus from measurements. Alternatively, during the observation of effects that are associated with particular events, it is possible to only select days on which the events or comparable events take place. For example, if effects are associated with a large sporting event, e.g., a football game, all measurements can be limited to the data of the events, e.g., to all home games of the team.

In some embodiments, the segments of the temporally segmented obfuscation interval have the same start time. During distribution of the obfuscation interval between multiple days, the individual segments can be designed so as to be correctly timed on a given day, i.e., all begin at an identical point in time. This increases the probability that the traffic situation is actually identical or very similar. However, the use of an identical start time is not absolutely necessary. For example, it can be taken into account that the afternoon rush hour on Fridays usually takes place earlier than on the other workdays, and therefore an earlier start time can be used for the corresponding segment. If the segments are to cover an entirely identical period of time, the segments of the temporally segmented obfuscation interval have the same length in addition to the same start time.

In some embodiments, segments of the temporally segmented obfuscation interval have a total length that is defined by a level of group anonymity to be achieved. The level of group anonymity defines how many vehicles that carry out a measurement analogously to the vehicle in question are required. For example, if 100 vehicles are required for achieving a given level of group anonymity, the obfuscation interval is selected such that said 100 vehicles are included within the interval. Thus, when the obfuscation interval is being divided into segments, it must be ensured that these 100 vehicles are also included in all of these segments taken together. Assuming an identical traffic density for each segment, this means that the length of the segments taken together corresponds to the length of the original obfuscation interval.

For example, a method or a device according to the teachings herein may be used in an autonomously or manually controlled vehicle, in particular a motor vehicle. Alternatively, the solution according to the teachings herein may also be used in a back end to which the data are transmitted from the vehicle.

Additional features of the present invention will become apparent from the following description and the appended claims in conjunction with the FIGS.

In order to improve understanding of the principles of the present invention, further embodiments will be explained in more detail in the following based on the FIGS. It should be understood that the invention is not limited to these embodiments and that the features described may also be combined or modified without departing from the scope of protection of the invention as defined in the appended claims.

FIG. 1 schematically shows a method for processing data recorded by a motor vehicle. In a first step, an item of data recorded by a motor vehicle is received 10. Subsequently, a temporal obfuscation is applied 11 to the received item of data. A temporally segmented obfuscation interval is used for the temporal obfuscation. Finally, the obfuscated item of data is forwarded 12 for further processing. The segments of the temporally segmented obfuscation interval may be on the same or on different days. If the segments are distributed over different days, weekends, holidays, or recurring events are for example taken into account. The segments may have the same start time and/or the same length. For example, the segments have a total length that is defined by a level of group anonymity to be achieved.

Figure 2:
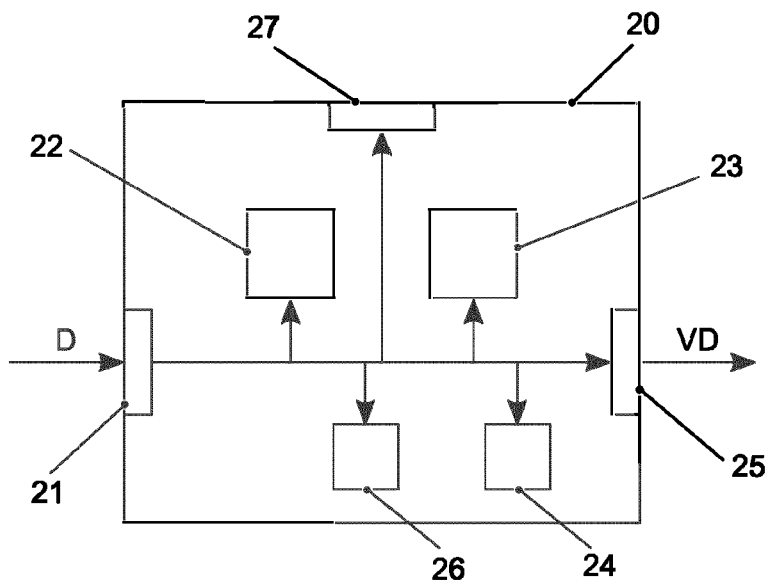
FIG. 2 shows a first embodiment of a device for processing data recorded by a motor vehicle.

FIG. 2 is a simplified schematic representation of a first embodiment of a device 20 for processing data recorded by a motor vehicle. The device 20 comprises an input 21 for receiving an item of data D recorded by the motor vehicle. An anonymization unit 23 applies a temporal obfuscation to the received item of data. The parameters required for the temporal obfuscation are determined and provided by a data processing unit 22. Finally, the obfuscated item of data VD is forwarded via an output 25 for further processing. The segments of the temporally segmented obfuscation interval may be on the same or on different days. If the segments are distributed over different days, weekends, holidays, or recurring events are, e.g., taken into account. The segments may have the same start time and/or the same length. For example, the segments have a total length that is defined by a level of group anonymity to be achieved.

The data processing unit 22 and the anonymization unit 23 may be controlled by a control unit 24. Settings of the data processing unit 22, anonymization unit 23, or control unit 24 may be changed, if required, via a user interface 27. The data accumulating in the device 20 may be deposited in a memory 26 of the device 20 if required, for example for later evaluation or to be used by the components of the device 20. The data processing unit 22, anonymization unit 23, and control unit 24 may be designed as dedicated hardware, for example as integrated circuits. Of course, they may also be partially or fully combined or be implemented as software running on a suitable processor, for example a GPU. The input 21 and the output 25 may be implemented as separate interfaces or as a combined bidirectional interface.

Figure 3:
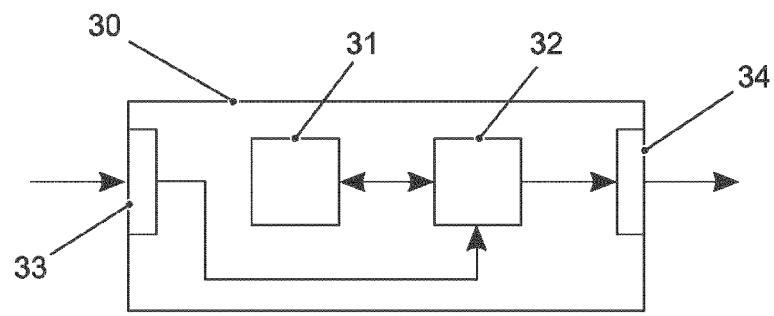
FIG. 3 shows a second embodiment of a device for processing data recorded by a motor vehicle.

FIG. 3 is a simplified schematic representation of a second embodiment of a device 30 for processing data recorded by a motor vehicle. The device 30 comprises a processor 32 and a memory 31. By way of example, the device 30 is a computer, a workstation, or a control unit. Instructions which, when executed by the processor 32, prompt the device 30 to carry out the steps according to any one of the methods described are stored in the memory 31. The instructions stored in the memory thus constitute a program that can be executed by the processor 32 and that implements the method according to the teachings herein. The device has an input 33 for receiving information. Data generated by the processor 32 are provided via an output 34. Said data may also be stored in the memory 31. The input 33 and the output 34 may be merged into a bidirectional interface.

The processor 32 may comprise one or more processor units, for example microprocessors, digital signal processors, or combinations thereof.

The memories 26, 31 of the embodiments described may have volatile and/or non-volatile memory regions and comprise a wide variety of storage units and storage media, for example hard drives, optical storage media, or semiconductor memories.

The two embodiments of the device may be integrated in the motor vehicle or be part of a back end that is connected to the motor vehicle.

Figure 4:
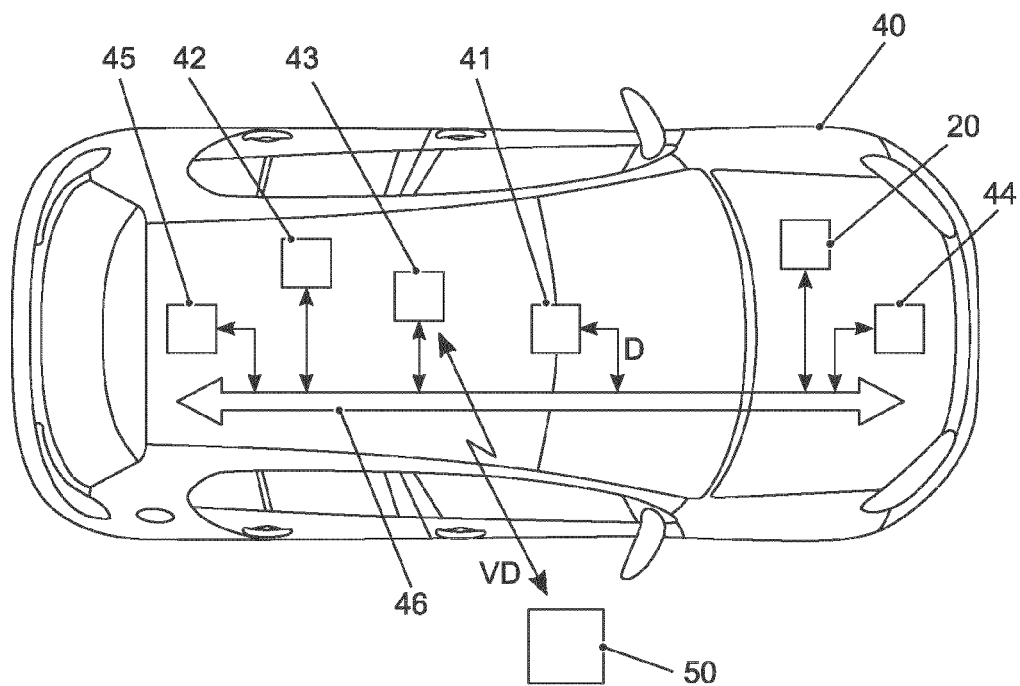
FIG. 4 is a schematic representation of a motor vehicle in which an embodiment is implemented.

FIG. 4 is a schematic representation of a motor vehicle 40 in which the solution according to the teachings herein is implemented. The motor vehicle 40 comprises a sensor system 41 by means of which data D can be recorded, for example a traffic situation. Other components of the motor vehicle 40 are a navigation system 42, a data transmission unit 43, and a series of assistance systems 44, of which one is shown by way of example. By means of the data transmission unit 43, a connection to a back end 50 can be established, in particular for transmitting recorded data. In this exemplary embodiment, a device 20 for processing the recorded data D provides for temporal obfuscation of the data, such that obfuscated data VD are transmitted to the back end 50. Alternatively, the obfuscation of the data D may not take place until said data are in the back end 50, before they are provided thereby to a data user. A memory 45 is present for storing data. The data exchange between the various components of the motor vehicle 40 takes place via a network 46.

Figure 5:
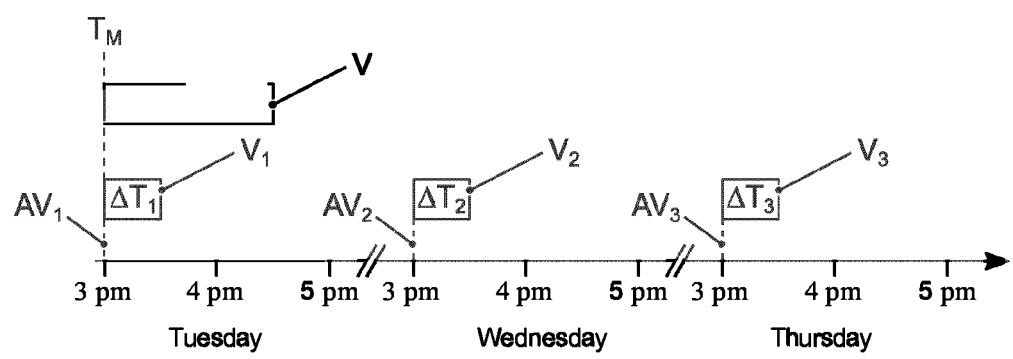
FIG. 5 illustrates exemplary temporal segmentation of an obfuscation interval.

FIG. 5 illustrates temporal segmentation of an obfuscation interval V. By way of example, the starting point is a measurement at a measuring time $T_M$. In the example shown, the measurement takes place on a Tuesday at 3:00 pm. For the obfuscation, a shift of the measuring time within an obfuscation interval V having a length of 90 mins is required in the present case in order to ensure sufficient anonymization. If the measurement is shifted within this obfuscation interval V within the same day, it is merely important for the measurement to be accordingly temporally blurred. A shift within an interval from 2:15 μm to 3:45 pm is just as possible as a shift within an interval from 3:00 μm to 4:30 pm for the purpose of anonymization. However, from a technical point of view, not only is it possible for the time stamp of the measurement to be shifted, but also the real point at which it is sent. In other words, the measured value is sent out at the randomly determined point in time. However, this is not possible if said point in time is in the past. As such, the interval from 3:00 μm to 4:30 pm is possible here.

Again by way of example, the data user has stipulated that the data be obfuscated such that the time of recording is shifted by no more than 30 mins within the same day, such that the traffic situation can be detected correctly.

In the present example, it is then assumed that the traffic situation repeats itself periodically on the same weekday at the same time. The required obfuscation interval V is therefore divided into different ranges or segments $V_i$ and distributed to the correct time on the corresponding days. The sum of the lengths $\Delta T_i$ of the individual segments $V_i$ at least corresponds to the length of the original obfuscation interval V, wherein the various segments $V_i$ do not necessarily have to have the same length. In order to reconcile the different requirements, in the example shown, the obfuscation interval V was divided into three segments $V_1$, $V_2$, $V_3$ having a length $\Delta T_1$, $\Delta T_2$, $\Delta T_3$ of 30 mins each. The individual segments $V_1$, $V_2$, $V_3$ or the start times $AV_1$, $AV_2$, $AV_3$ of the segments $V_1$, $V_2$, $V_3$ are in each case shifted by 24 hours relative to one another. In this way, the corresponding phenomena that depend on the time of day can be analyzed without compromising the anonymization. Of course, instead of the division into three segments $V_1$, $V_2$, $V_3$ shown in FIG. 5, it is also possible, depending on the boundary conditions, to divide into more than three segments $V_1$, $V_2$, $V_3$, which can then be shorter.

LIST OF REFERENCE NUMERALS

10 Receiving a recorded item of data
11 Applying a temporal obfuscation to the item of data
12 Forwarding the obfuscated item of data for further processing
20 Device
21 Input
22 Data processing unit
23 Anonymization unit 24 Control unit
25 Output
26 Memory
27 User interface
30 Device
31 Memory
32 Processor
33 Input
34 Output
40 Motor vehicle
41 Sensor system
42 Navigation system
43 Data transmission unit
44 Assistance system
45 Memory
46 Network
50 Back end
$AV_i$ Start time
D Item of data
$\Delta T_i$ Segment length
$T_M$ Measuring time
V Obfuscation interval
VD Obfuscated item of data
$V_i$ Segment The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A motor vehicle, configured to carry out a method for processing data recorded by the motor vehicle to provide a temporal obfuscation interval having a specified length, the method comprising:

receiving an item of data recorded by the motor vehicle;

applying a temporal obfuscation to the received item of data, including temporally segmenting the temporal obfuscation interval into two or more time-spaced segments, wherein (a) each time-spaced segment has a shorter length than the specified length of the temporal obfuscation interval and (b) a sum of the lengths of the two or more time-spaced segments is equal to or greater than the specified length of the temporal obfuscation interval; and forwarding the obfuscated item of data for further processing.

2. The motor vehicle of claim 1, wherein segments of the temporally segmented obfuscation interval are on different days.

3. The motor vehicle of claim 2, wherein weekends, holidays, or recurring events are considered if the segments of the temporally segmented obfuscation interval are distributed over different days.

4. The motor vehicle of claim 3, wherein the segments of the temporally segmented obfuscation interval have the same start time.

5. The motor vehicle of claim 3, wherein the segments of the temporally segmented obfuscation interval have the same length.

6. The motor vehicle of claim 3, wherein segments of the temporally segmented obfuscation interval have a total length that is defined by a level of group anonymity to be achieved.

7. The motor vehicle of claim 2, wherein the segments of the temporally segmented obfuscation interval have the same start time.

8. The motor vehicle of claim 7, wherein the segments of the temporally segmented obfuscation interval have the same length.

9. The motor vehicle of claim 7, wherein segments of the temporally segmented obfuscation interval have a total length that is defined by a level of group anonymity to be achieved.

10. The motor vehicle of claim 2, wherein the segments of the temporally segmented obfuscation interval have the same length.

11. The motor vehicle of claim 10, wherein segments of the temporally segmented obfuscation interval have a total length that is defined by a level of group anonymity to be achieved.

12. The motor vehicle of claim 2, wherein segments of the temporally segmented obfuscation interval have a total length that is defined by a level of group anonymity to be achieved.

13. The motor vehicle of claim 1, wherein segments of the temporally segmented obfuscation interval have a total length that is defined by a level of group anonymity to be achieved.

* * * * *